(12) United States Patent
Zhu (10) Patent No.: US 6,357,028 B1
(45) Date of Patent: Mar. 12, 2002

(54) ERROR CORRECTION AND CONCEALMENT DURING DATA TRANSMISSION

(75) Inventor: Qin-Fan Zhu, Wilmington, MA (US)

(73) Assignee: PictureTel Corporation, Andover, MA (US)

( * ) Notice: Subject to any disclaimer, the term of this patent is extended or adjusted under 35 U.S.C. 154(b) by 0 days.

(21) Appl. No.: 09/272,792

(22) Filed: Mar. 19, 1999

(51) Int. Cl.$^7$ .......................... H03M 13/00; H04L 1/18
(52) U.S. Cl. ....................................... 714/751
(58) Field of Search ................................ 714/748, 750, 714/751, 1, 3, 4, 18, 43, 56, 746, 747, 479

(56) References Cited

U.S. PATENT DOCUMENTS

| | | | | |
|---|---|---|---|---|
| 3,979,719 A | * | 9/1976 | Tooley et al. | 714/748 |
| 5,036,518 A | * | 7/1991 | Tseung | 714/748 |
| 5,550,847 A | * | 8/1996 | Zhu | 714/748 |
| 5,577,172 A | * | 11/1996 | Vatland et al. | 358/1.15 |
| 5,680,322 A | * | 10/1997 | Shinoda | 714/18 |
| 5,864,654 A | * | 1/1999 | Marchant | 714/3 |
| 5,918,002 A | * | 6/1999 | Klemets et al. | 714/18 |
| 5,968,197 A | * | 10/1999 | Doiron | 714/748 |
| 6,032,180 A | * | 2/2000 | Nishikawa | 725/115 |
| 6,104,757 A | * | 8/2000 | Rhee | 375/240.12 |
| 6,141,785 A | * | 10/2000 | Hur et al. | 714/748 |
| 6,173,317 B1 | * | 1/2001 | Chaddha et al. | 709/219 |
| 6,230,296 B1 | * | 5/2001 | Hanko et al. | 714/748 |

OTHER PUBLICATIONS

Wada, Mashiro, 'Selective Recovery of Video Packer Loss Using Error Concelament', IEEE Journal on Selected Areas in Communications, vol. 7, No. 5, Jun. 1989.*
Trillium, "H.323 Tutorial" Dec. 2, 1998.
DataBeam, "A Primer on the H.323 Series Standard", May 1998.
Wang et al., "Error Control and Concealment for Video Communication: A Review", Proceedings of the IEEE, vol. 86., No. 5, pp. 974–997, May 1998.
Schulzrinne et al., "RTP: A Transport Protocol for Real–Time Applications," Network Working Group, RFC 1889, Jan. 96.
Schulzrinne et al., "RTP: Profile for Audio and Video Conferences with Minimal Control," Network Working Group, RFC 1890, Jan. 96.
International Telecommunication Union, "ITU–T Recommendation H.263", Nov. 95.
Turletti et al., "RTP payload format for H.261 video streams," Internet Engineering Task Force, Audio–Video Transport WG, Jul. 10, 1995.
Turletti et al., "RTP packetization of H.261 video streams", Internet Engineering Task Force, Audio–Video Transport WG, Mar. 1995.
Wada, "Selective Recovery of Video Packet Loss Using Error Concealment", *IEEE Journal on Selected Areas in Communications*, pp. 807–814, 1989.
Cote et al., "H.263+: Video Coding at Low Bit Rates," Department of Electrical and Computer Engineering, University of British Columbia, pp. 1–41.

* cited by examiner

Primary Examiner—Albert Decady
Assistant Examiner—Joseph D. Torres
(74) Attorney, Agent, or Firm—Ropes & Gray (57) ABSTRACT

A transmitting terminal transmits the data to a server and the server transmits the data to a receiving terminal. The server detects transmission errors in the data. If the server detects a transmission error, the server sends a request to the transmitting terminal for data correcting the effects of the detected transmission error on data affected by the detected transmission error. The server also sends the affected data to the receiving terminal prior to receiving the correction data. In other words, the server does not wait to receive the correction data before sending the affected data to the receiving terminal. Additionally, the server modifies the data received from the transmitting terminal to conceal the detected error from the receiving terminal.

45 Claims, 9 Drawing Sheets

ERROR CORRECTION AND
CONCEALMENT DURING DATA
TRANSMISSION

BACKGROUND

This invention relates to transmitting data from a transmitting terminal to a receiving terminal through a third component, and more particularly to transmitting video data for videoconferencing and video telephony, and error correction and concealment during such transmission.

Transmitting data by a packet-switched network is one of the most common methods of transmitting data. As with any other type of data transmission, data transmitted by a packet-switched network can be affected by transmission errors such as loss of packets.

Loss of some packets in a data flow can significantly affect the rest of the data flow. For example, consider the situation where the transmitted data is digital video encoded by a prediction based compression technique. In that case, loss of packets will affect not only a particular frame to which the data in the lost packets belong, but also subsequent frames. In addition, if the compression technique uses motion compensation, then the lost packets will affect not only a particular region in the frames, but also surrounding regions in the subsequent frames, the extent of which depends on the value of the motion vectors. Similarly, if the transmitted data is digital video encoded using variable length coding (for example, Huffman coding), the packet loss can render the information contained in one or more of the subsequent packets unusable.

Various techniques have been developed to minimize, and even correct for, the effects of packet loss on transmitted video data. One set of techniques attempt to reduce the effect of packet loss by including redundant control data in all packets. For example, some packetization protocols require control data necessary for decoding a packet to be included in a packet's header, even though the same information is included in a preceding packet.

Another set of techniques attempt to reduce the effects of lost data on the video image by replacing the lost data with other data. For example, according to one such technique, the lost data is replaced with data from a preceding frame, thereby attempting to improve the image quality of the current frame and reduce errors in subsequently decoded frames. Yet another set of techniques provide methodologies for allowing a receiving terminal to determine whether a packet has been lost and, if so, send a request for a correction of the lost data to the transmitting terminal. The transmitting terminal then provides data which corrects the effects of the lost data. For a summary of various error concealment and correction techniques, see Y. Wang and Q. -F. Zhu, "Error Control and Concealment for Video Communication: A Review," *Proc. IEEE*, vol. 86, no. 5, pp. 974–997, May 1998. In another technique, a network switch detects a packet loss and requests a retransmission of the lost packet. The switch does not forward subsequent packets until it receives the replacement packet. Of course, if the packets contain video data being transmitted for realtime display, the delay can have significant negative impact on the displayed video.

It should be noted some of the these techniques require that a receiving terminal detect the packet loss. However, error detection at the receiving terminal becomes difficult where the data transmission path includes two networks governed by different protocols because a gateway between the two networks typically removes packet headers from the packets before forwarding the information contained in the packets to the receiving terminal. Removal of the packet headers makes error detection more difficult, since the packet headers typically contain data which can be used for error detection. One type of error detection that a receiving terminal can perform is to use its video decoder to detect packet loss errors by checking whether the received video bitstream is in conformance with the bitstream syntax of the encoding algorithm.

SUMMARY

In a general aspect, the invention relates to transmitting data from a transmitting terminal to a receiving terminal through a server. The invention features detecting transmission errors in the data at the server and, if an error is detected at the server, sending a request from the server to the transmitting terminal for data correcting the effects of the transmission error on the data affected by the transmission error. The affected data is transmitted from the server to the receiving terminal prior to receiving the correction data.

In another general aspect, the invention relates to a server for receiving data transmitted by a transmitting terminal and transmitting the data to a receiving terminal. The server features a receiver receiving data transmitted from the transmitting terminal to the server; a detector detecting transmission errors in the data; a first transmitter sending, if an error is detected, a request to the transmitting terminal for data correcting the effects of the transmission error on the data affected by the transmission error; and a second transmitter transmitting the affected data from the server to the receiving terminal prior to receiving the correction data.

In yet another aspect, the invention relates to a system including a transmitting terminal, a receiving terminal, and a server, where the transmitting terminal transmits the data to the server and the server transmits the data to the receiving terminal. The invention features a server which detects transmission errors in the data, and, in response to certain of such errors, sends a request to the transmitting terminal for data correcting the effects of the transmission error on the data affected by the transmission error. The server sends the affected data to the receiving terminal prior to receiving the correction data.

Preferred embodiments of the invention may include one or more of the following features.

The server is connected between two networks transmitting data from one network to another. The data includes a plurality of packets. Data can be digital video or compressed digital video, such as video compressed by a compression technique which uses motion compensation.

The transmission error can be loss of a packet. Where the transmitted packets are consecutive packets of data identified by sequence numbers, the loss of the packet can be detected by identifying a missing sequence number. The server determines the pixels of at least one frame of video affected by the lost packet, and includes in the request sent to the transmitting terminal information identifying at least a portion of the pixels to the transmitting terminal. The pixels can be from a single frame or from more than one frame.

The data received at the server is processed to conceal the detected error from the receiving terminal or other downstream components. Where the data is transmitted by the server to the receiving terminal according to a predetermined syntax, the process of concealing the error includes modifying the packets such that the transmitted data conforms to that predetermined syntax.

In response to the request, data can be sent to the receiving terminal to correct the data affected by the transmission error. Where the data is digital video data compressed by a prediction based compression technique, and some of the data is lost, the digital video data can be compressed, without relying on video data corresponding to data lost during transmission, to provide the data to be sent to correct the data affected by the transmission error.

The invention may include one or more of the following advantages.

Embodiments of the invention reduce the time required to recover from transmission errors such as packet loss when transmitting data (for example, video) between two or more terminals. In addition, some embodiments improve end-to-end video quality when compressed video data is lost or damaged during transmission.

Where the transmitting terminal is multi-casting to multiple receiving terminals through a single server, by detecting the error at the server rather than at each of the receiving terminals, only a single error correction request is sent to the transmitting terminal as opposed to multiple requests from the receiving terminals.

In addition, by concealing the transmission error from the receiving terminals, picture quality at those terminals can be improved as those terminals need not wait for response to their error correction requests. Waiting for such a response can result in the terminal freezing the image on the monitor for a relatively long time. In addition, concealing the error from downstream components and receiving terminals reduces the possibility of receiving multiple error correction requests from those terminals.

The invention may be implemented in hardware or software, or a combination of both. Preferably, the technique is implemented in computer programs executing on programmable computers that each include a processor, and a storage medium readable by the processor (including volatile and non-volatile memory and/or storage elements). Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium configured with a computer program, where the storage medium so configured causes a computer to operate in a specific and predefined manner.

Other features and advantages of the invention will become apparent from the following description of preferred embodiments, including the drawings, and from the claims.

DESCRIPTION

Figure 1:
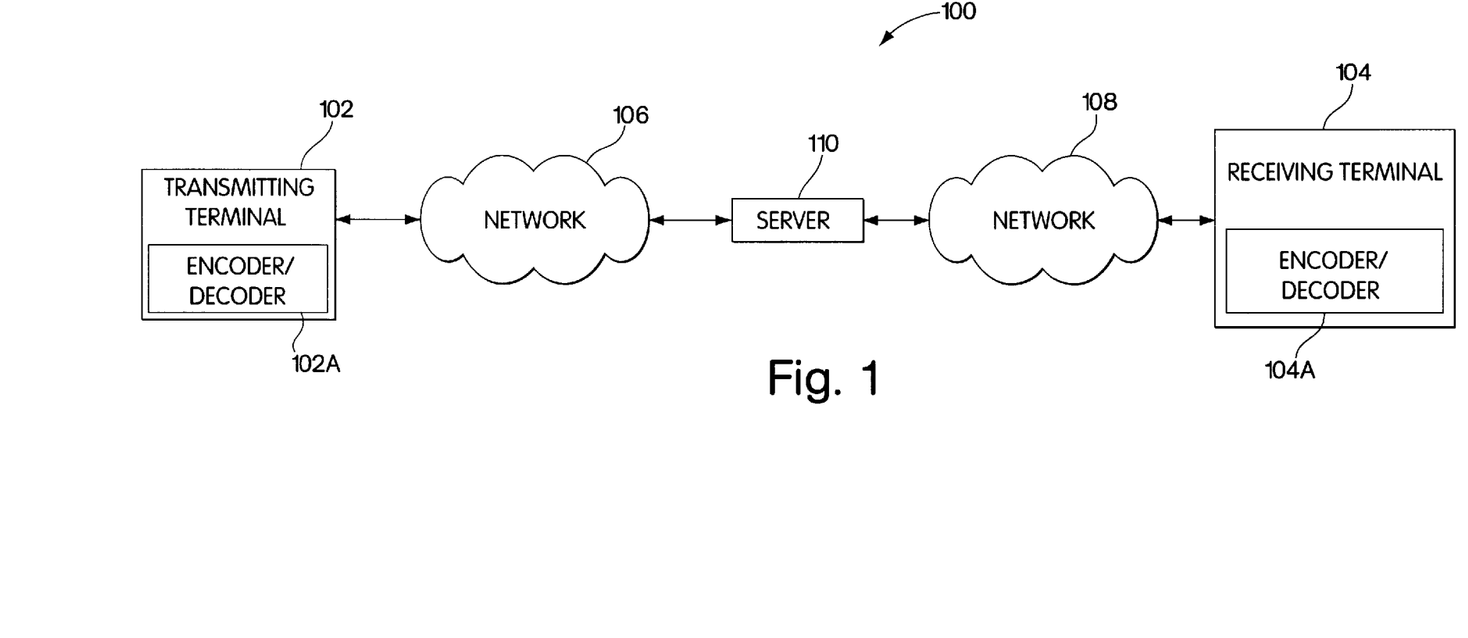
FIG. 1 shows an arrangement of components for transferring digital audio and video from a transmitting terminal to a receiving terminal through a server.

FIG. 1 shows an arrangement of components 100 for transferring digital audio and video from a transmitting terminal 102 to a receiving terminal 104 through a server 110. Terminals 102 and 104 can be videoconferencing units, each having an encoder/decoder 102A and 104A, respectively. Transmitting terminal 102 is connected to a network 106, which is a packet switched network. Receiving terminal 104 is in turn connected to a network 108, which can also be a packet switched network. Networks 106 and 108 are connected to one another through server 110 which can be a gateway, a multipoint control unit (MCU), or any other network component enabling transfer of data between networks 106 and 108. Each of networks 106 and 108 operates according to a data transmission protocol which is different from the other network's data transmission protocol. For example, network 106 can be an Internet Protocol (IP) network, while network 108 can be an Integrated Services Digital Network (ISDN).

Figure 2:
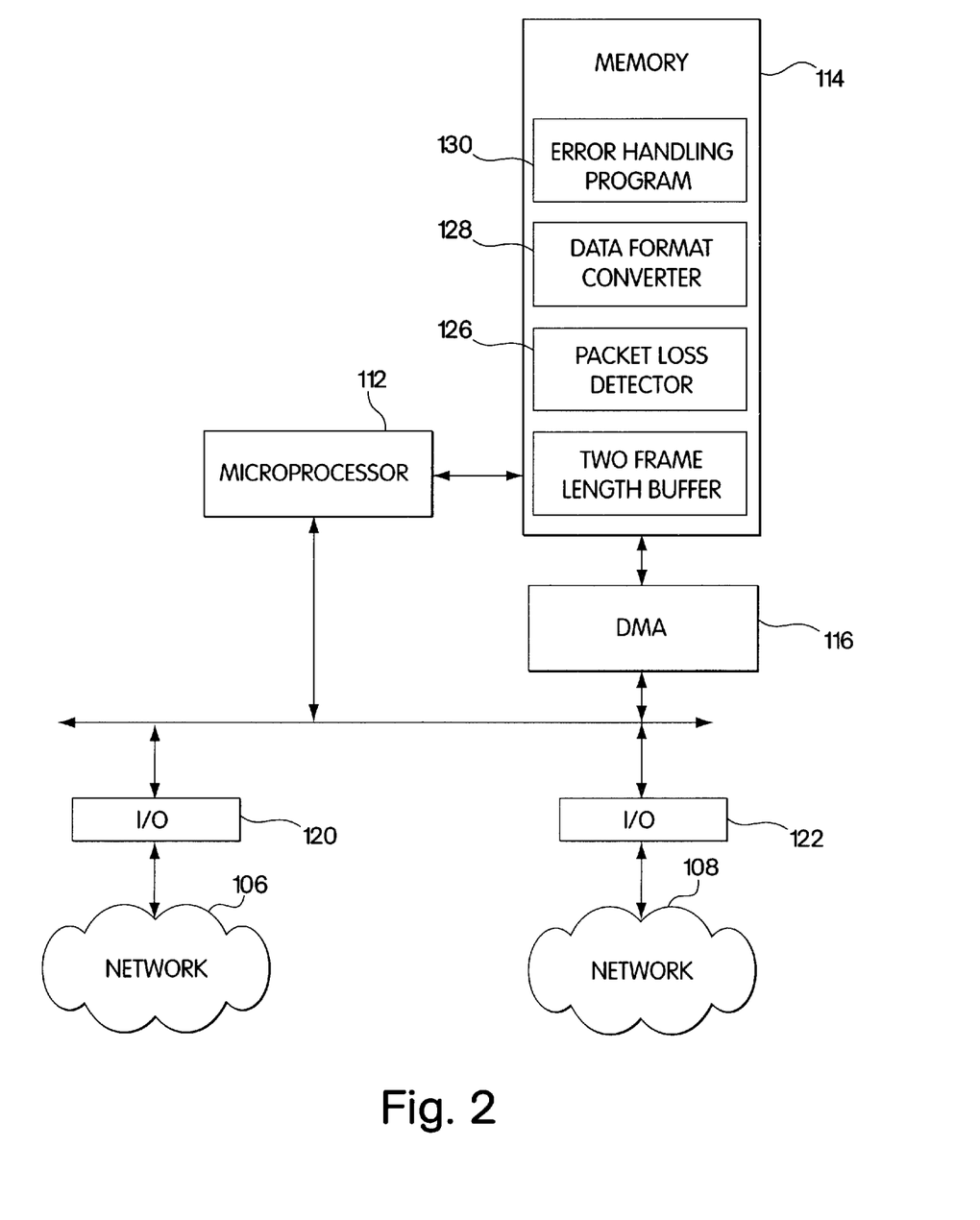
FIG. 2 shows a block diagram of parts of the server of FIG. 1.

FIG. 2 shows a block diagram of components of server 110. Server 110 includes a microprocessor 112, a memory 114, a direct memory access (DMA) controller 116, and a peripheral bus 118. Server 110 also includes two input/output (I/O) ports 120 and 122 connected to peripheral bus 118. In addition, I/O ports 120 and 122 are respectively connected to networks 106 and 108. Server 110 also stores a number of application programs in memory 114, including an error handling program 130, a data format convertor 128, and a packet loss detector 126.

Briefly, transmitting terminal 102 transmits data, such as compressed audio and video, to receiving terminal 104 through server 110. During transmission, server 110 detects transmission errors, namely loss of data packet(s). Once server 110 detects such an error, server 110 performs two operations. First, server 110 sends an error correction request to transmitting terminal 102 so that transmitting terminal 102 can send data to receiving terminal 104 to correct for the lost data. Second, server 110 repairs its output bitstream so that receiver terminal 104 does not detect any errors in the bitstream it receives. In effect, server 110 conceals the packet loss error from receiver terminal 104. Server 110, without waiting for a response to its error correction request, forwards the repaired data to receiving terminal 104.

To better understand the operation of server 110 and its components, it is important to first understand the manner in which video is encoded and packetized for transmission from transmitting terminal 102 to receiving terminal 104. Although there are many ways to encode and packetize video data, the embodiments here will be described in reference to the H.323 standard established by International Telecommunications Union (ITU). This standard is a popular standard used for videoconferencing and video telephony and is widely deployed in Internet Protocol (IP) networks.

According to the H.323 standard, encoder/decoder 102A of transmitting terminal 102 first compresses a video signal using an encoding algorithm implementing either the ITU Telecommunication Standardization Sector (ITU-T) H.261 standard or the ITU-T H.263 standard. (In the following description, we will describe the embodiments with reference to the H.263 standard.) Transmitting terminal 102 then packetizes the compressed video according to the ITU-T H.225.0 standard which uses the Real-Time Protocol (RTP) of the International Engineering Task Force (IETF). These packets are then transported by an underlying technology supported by network 106 such as User Datagram Protocol/ Internet Protocol (UDP/IP). Hence, transmitting terminal 102 encapsulates the RTP packets into UDP/IP packets and transmits them to server 110. I/O port 120 of server 110, after receiving the UDP/IP packets, reconstructs the RTP packets before processing the RTP packets or retransmitting them. Format convertor 128 of server 110 transforms the RTP packets into a suitable format (for example, the ITU-T H.221 bit stream which is suitable for transmission across an ISDN network) for transmission over network 108 to receiving terminal 104. There, receiving terminal 104 processes the received packets to recover the video data.

Figure 3:
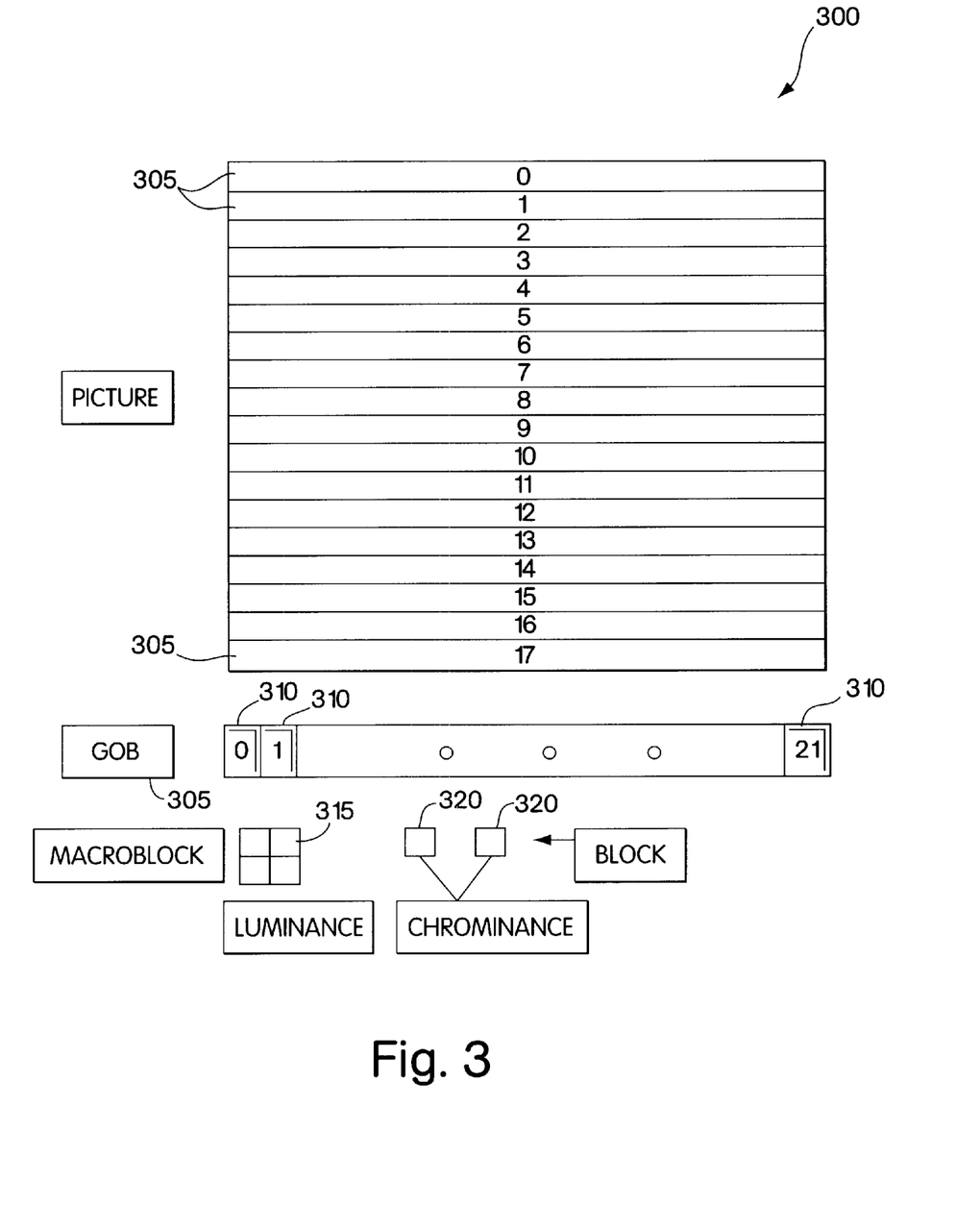
FIG. 3 is a schematic diagram of the manner in which a video frame is partitioned according to the ITU-T H.263 standard.

Referring to FIG. 3, according to the H.263 standard, a frame 300 of video is partitioned into rectangular regions called Groups Of Blocks (GOBs) 305. Each GOB 305 is composed of multiple macroblocks 310. A macroblock 310 contains 4 luminance blocks 315 and 2 chrominance blocks 320, where each block is a square block of 8×8 pixels.

According to the H.263 standard, video frames can be compressed in two modes: intra mode where the frame is encoded without reliance on other encoded frames, and inter mode where the frame is encoded using inter-frame prediction such that only the prediction error, that is, the difference between the current frame and another encoded frame, is encoded.

The H.263 standard also uses motion compensation in encoding video data. Motion compensation is based on an observation an image in one video frame is often the same as an image in a preceding or a following video frame, except that the image may have moved. For example, two consecutive video frames showing a moving car would have the image of the car, except that the car has moved and its relative location has changed.

Figure 4:
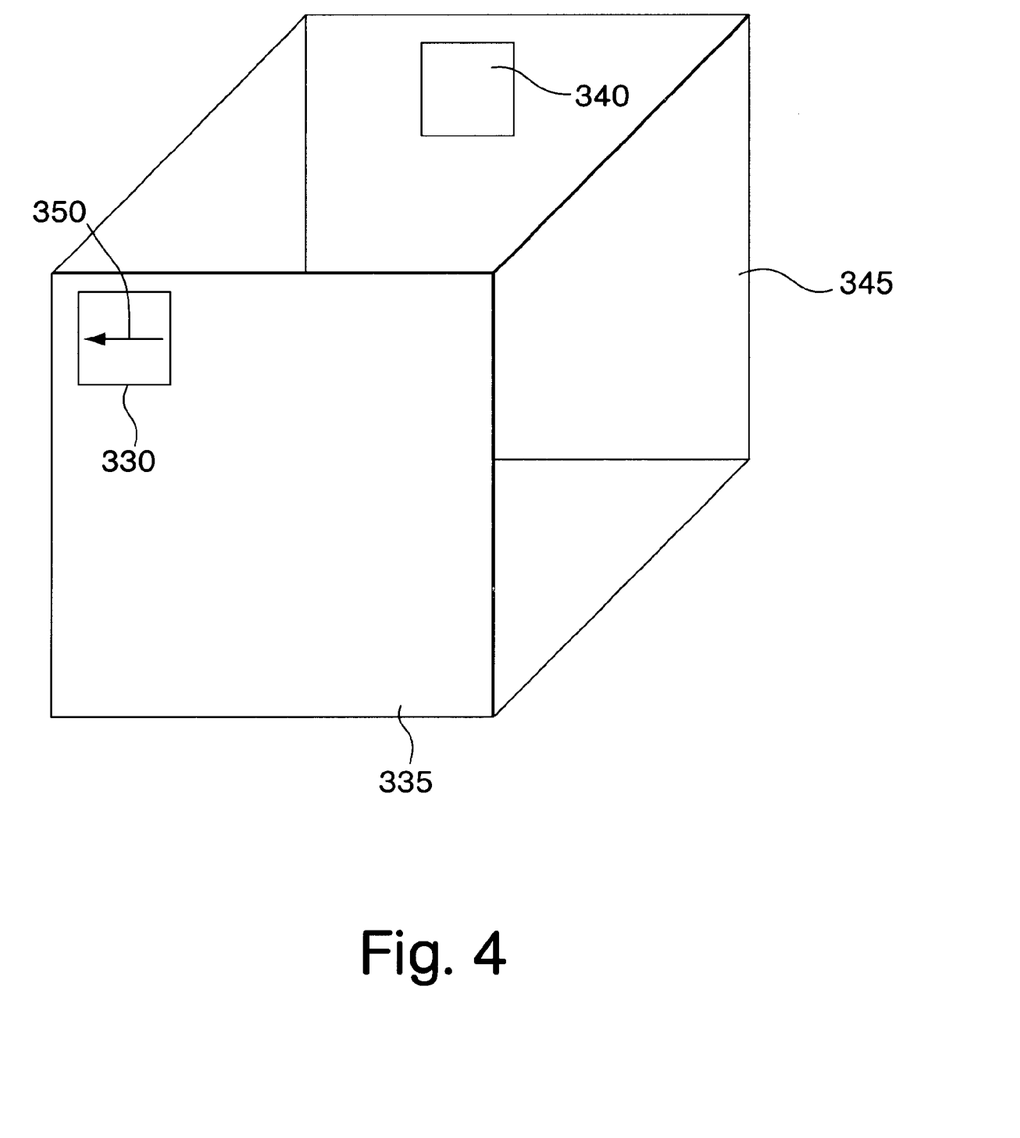
FIG. 4 schematically illustrates the relationship between positions of two related macroblocks in two consecutive frames and a motion vector characterizing that relationship.

Referring to FIG. 4, the H.263 standard motion compensation requires matching a macroblock 330 of a frame 335 to a macroblock 340 of a preceding frame 345, and then determining a value for a motion vector 350. This value is then included in the encoded video in association with the macroblock.

Figure 5:
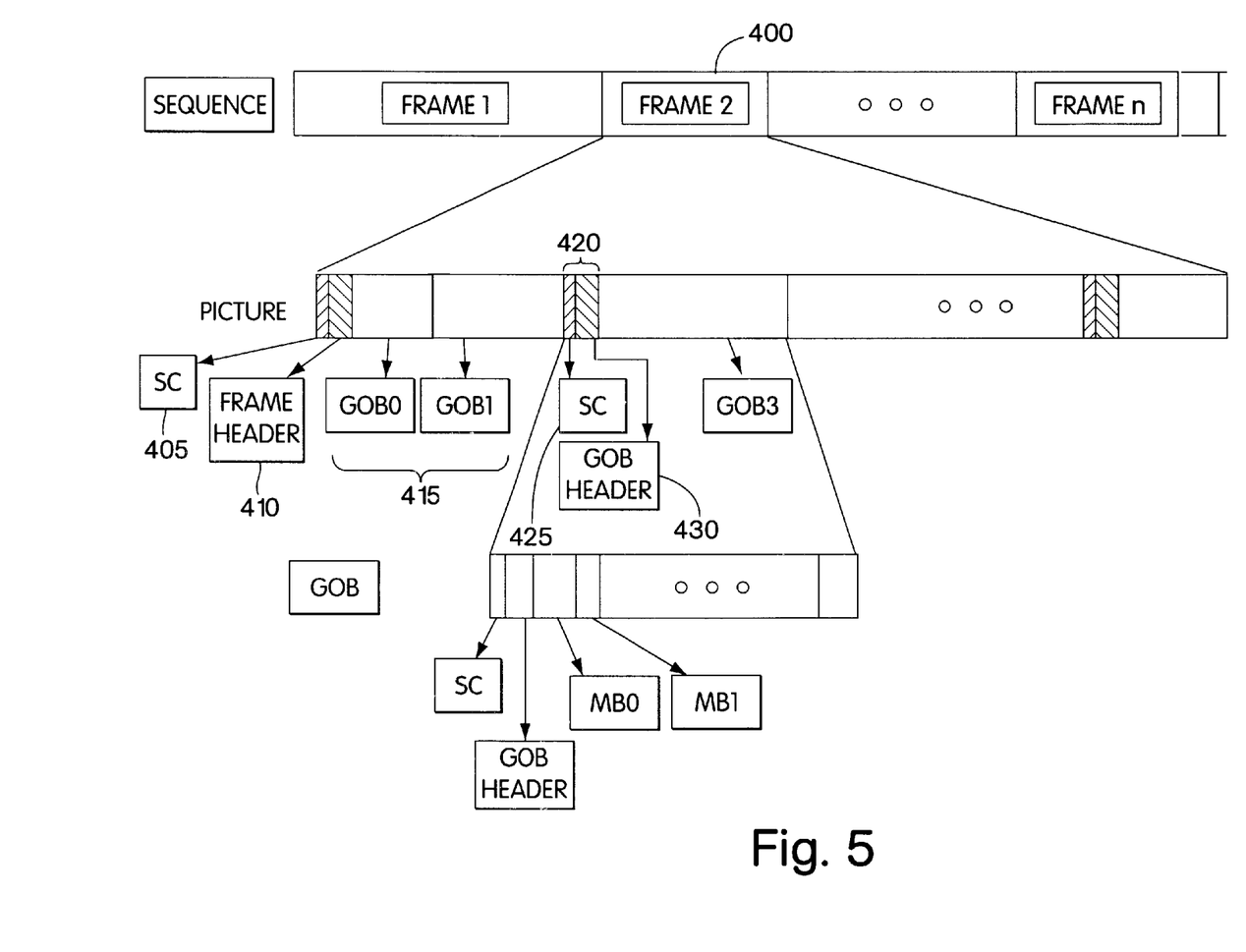
FIG. 5 is a schematic diagram of the organization of data representing video frames compressed according to the ITU-T H.263 standard.

FIG. 5 is a representation of data representing a video frame 400 compressed according to the H.263 standard. Compressed frame 400 starts with a start code (SC) 405 (here, 16 0-bits followed by a single 1-bit). Start code 405 is followed by a frame header 410. Frame header 410 includes such information as frame wide coding mode (for example, whether the frame is inter-frame or intra-frame coded, the H.263 annexes for encoding, etc.). Frame header 410 is followed by the GOBs in the frame. The first GOB (GOB$_0$) does not have a header field 420 while each of the other GOBs can optionally have a header field. Each header field 420 starts with a GOB start code SC 425 and a GOB header 430. GOB header 430 will include such information as a GOB number and a quantization step value used in encoding the first macroblock in that GOB.

After each GOB header field 420, the GOB data follows which includes the data from macroblocks corresponding to that GOB. An empty macroblock is stored as a 1 bit flag signaling that the block is empty. A non-empty macroblock is encoded and has variable number of bits of data. Each macroblock in a GOB will have a macroblock header which will include control data required for decoding that macroblock such as its coding mode, relevant motion vectors, and DCT coefficients. The macroblock header of the first macroblock in a GOB having a GOB header stores the actual value of the control data. The macroblock headers of the other macroblocks typically store prediction coded values of the control data, which in the described embodiment is the change in value of the control data from the value of the control data of the previous macroblock. However, each macroblock can optionally store the actual (i.e. non-prediction coded) value of these variables.

Figure 6:
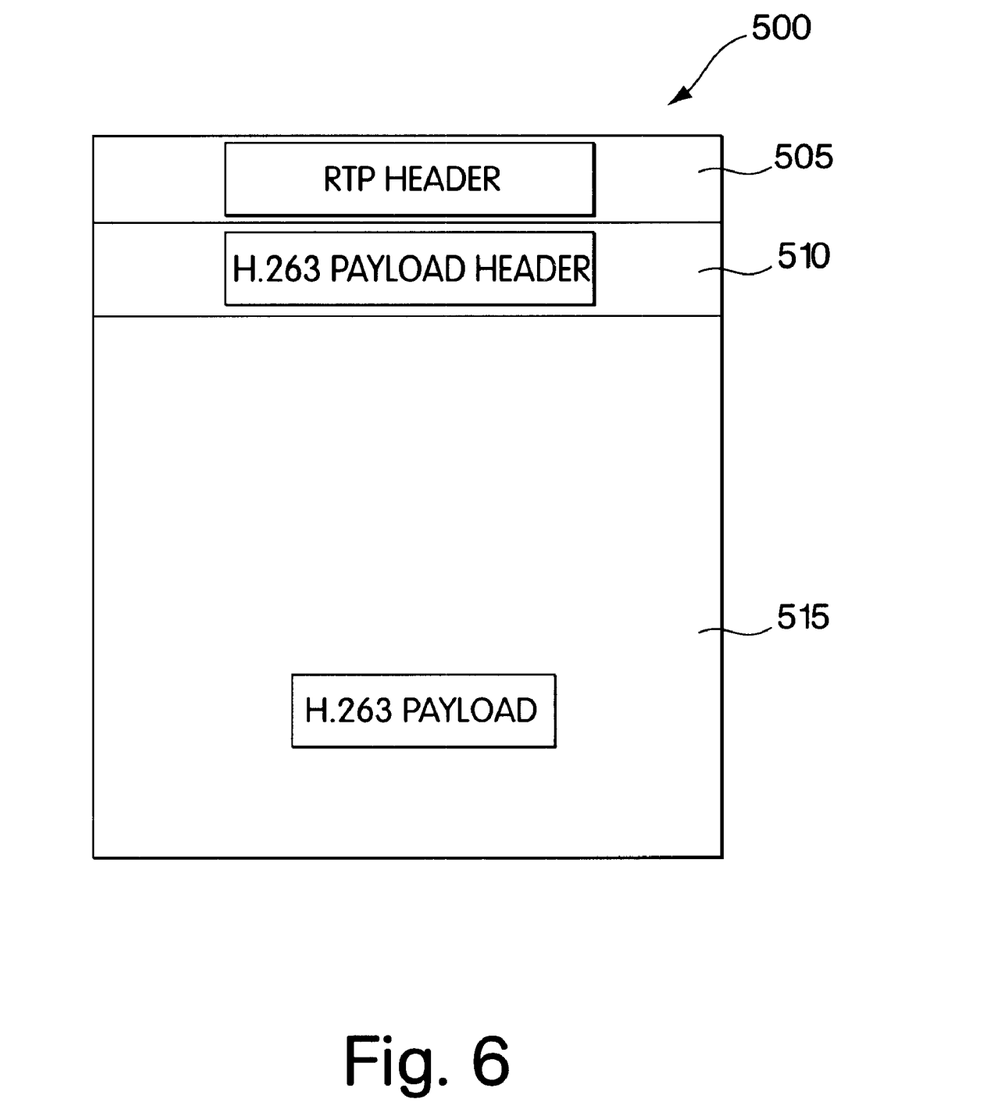
FIG. 6 shows a high-level architecture of an RTP packet.

As mentioned, after compressing the frames of video, transmitting terminal 102 packetizes the compressed frames into RTP packets. FIG. 6 shows a high-level architecture of an RTP packet 500. RTP packet 500 has a header section 505 which contains such information as a sequence number (SN), a time stamp (TS), and a marker bit. Sequence numbers (SNs) are consecutive numbers assigned to consecutive RTP packets in an RTP packet stream. If an RTP packet is lost, the sequence numbers of RTP packets arriving at server 110 will not be consecutive. The time stamp (TS) field in header section 505 stores the time when a frame was encoded. The time stamp of a video frame is unique to that frame. If a frame is packetized into multiple RTP packets, the time stamps (TS) for all the RTP packets corresponding to that frame will have the same value. Time stamps (TS) are typically used for achieving audio/video synchronization. The marker bit in header section 505 indicates whether the RTP packet contains the end of a frame.

The H.263 payload header 510 contains such information as the frame type (intra-or inter-frame coded), frame format (CIF, QCIF, 4CIF, etc.), and information on whether the RTP packet starts at a GOB boundary or a macroblock boundary. Payload header 510 can also have further information depending on whether the packet is a type 'A' or type 'B' RTP packet. Type 'B' RTP packets contain redundant control data from the preceding packet necessary for decoding. The redundant control data consists of control data from the GOB header of the last GOB and from the macroblock header of the last macroblock in the preceding RTP packet. The redundant control data includes the motion vector predictor, the quantization step size, and the address of the first macroblock in the current RTP packet. The values stored in payload header 510 are the actual values of these variables, as opposed to their prediction coded values. Hence, type 'B' RTP packets allow decoding the first macroblock without resorting to information contained in the previous RTP packet, in case that previous RTP packet is lost. Type 'A' RTP packets do not contain such redundant control data in their headers.

Encoder/decoder 102A of transmitting terminal 102 determines whether an RTP packet will be of type 'A' or type 'B' depending on the video data to be included in the packet. There are three cases: video data starts at the beginning of a GOB having a header; video data starts at the beginning of a GOB not having a header; and video data starts at a macroblock boundary (that is, not at a GOB boundary). In the case of video data starting at a GOB having a header, RTP packet will be packetized as a type 'A' packet since information required for decoding the data will be in the GOB header. In the case of video data starting at a GOB which does not have a header, RTP packet can be packetized as either a type 'A' or type 'B' packet. Preferably, the packet would be packetized as a type 'B' packet, since the information for decoding the video data depends on information in the previous packet. In the case of video data starting at a macroblock boundary, RTP packet will be packetized as a type 'B' packet.

The H.263 payload 515 of RTP packet 500 contains the encoded video data, such as compressed video frame 400 shown in FIG. 5.

Figure 7:
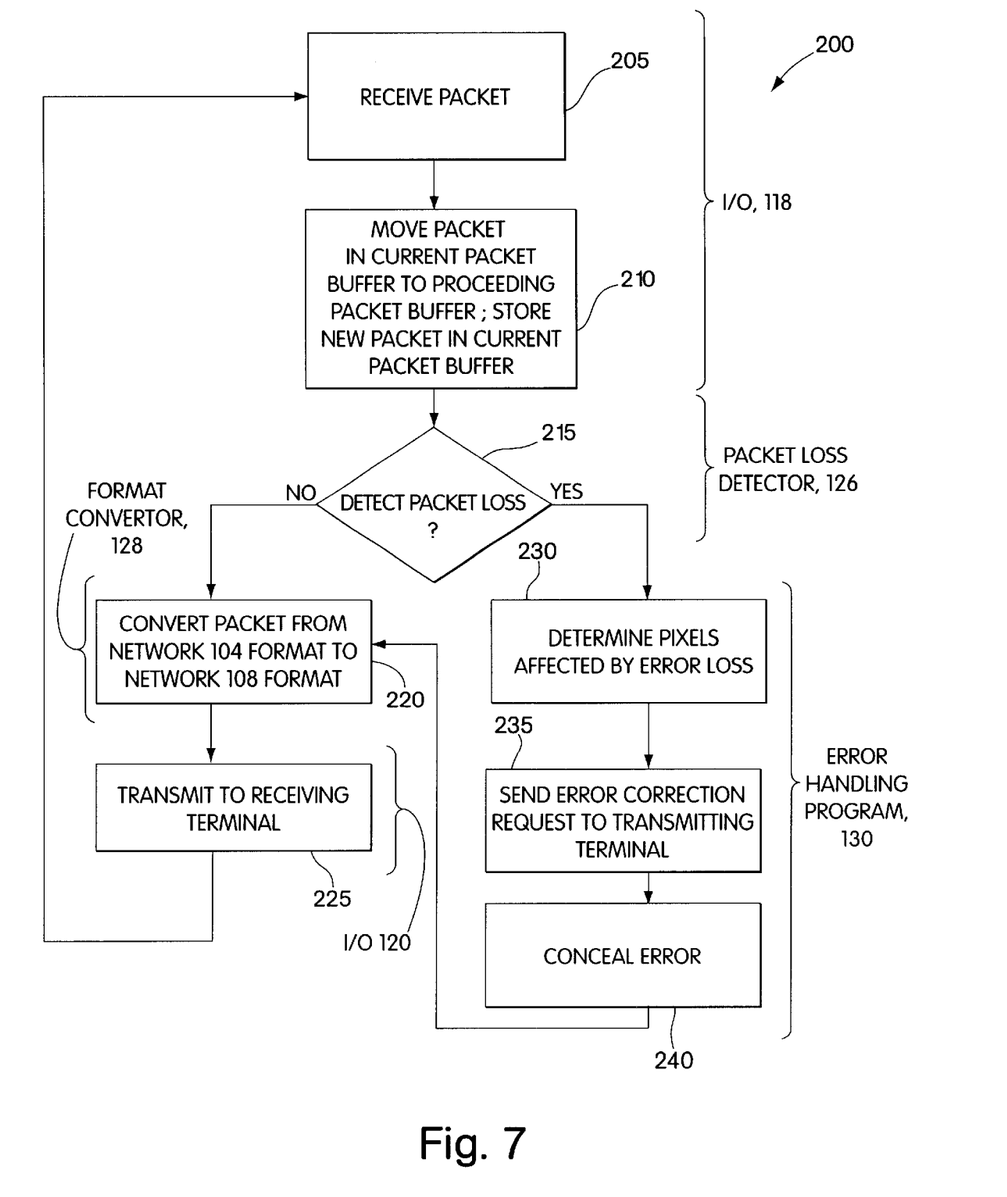
FIG. 7 is a flow chart of the operation of the server of FIG. 2.

Referring to FIG. 7, the operation of server 110 will now be described in reference to flow chart 200. During operation, I/O port 120 receives from network 106 UDP/IP packets from which I/O port 120 reconstructs RTP packets. When I/O port 120 has reconstructed an entire RTP packet (step 205), I/O port 120 indicates the receipt of the RTP packet to DMA Controller 116. DMA controller 116 stores the RTP packet in a current packet buffer, replacing a previously stored frame in that buffer. DMA controller 116 also transfers the previously stored RTP packet to a preceding packet buffer (step 210).

Packet loss detector 126 determines whether any RTP packet has been lost since the receipt of the preceding RTP packet (step 215). To do so, packet loss detector 126 compares the sequence number of the RTP packet stored in the current packet buffer with the sequence number of the RTP packet stored in the preceding packet buffer. If the sequence numbers are not consecutive, packet loss detector 126 determines that one or more RTP packets have been lost.

If no RTP packet has been lost since the receipt of the preceding packet, packet loss detector 126 indicates to format convertor 128 to prepare the RTP packet for transmission over network 108 to receiving terminal 104. Format convertor 128 converts RTP packets received from network 106 into a format acceptable to network 108 (step 220). For example, if network 108 is an ISDN network, format convertor 128 depacketizes the video data into an ITU-T H.221 bit stream packets for network 108. Format conversion often entails removing the RTP Header and payload header from the received data. Upon conversion, format convertor 128 transfers the packets to I/O port 122 for transmission (step 225).

If packet loss detector 126 determines that an RTP packet has been lost during transmission, microprocessor 112 executes error handling program 130. Error handling program 130 determines the area (that is, pixels) which were represented by the data in the lost RTP packet(s) (step 230). Error handling program 130 then sends an error correction request to transmitting terminal 102 (step 235). Error handling program 130 also conceals the packet loss error from downstream components, namely receiving terminal 104 (step 240). To do so, error handling program 130 repairs the bit stream transmitted downstream so that it conforms to the H.263 syntax for encoded video data. Since, in the described embodiment, receiving terminal 104 detects packet loss errors in the bitstream by determining whether the received data conforms to the H.263 syntax for encoded video data, receiving terminal 104 does not detect any transmission errors. After repairing the bitstream, error handling program 130 transfers the repaired bitstream to format convertor 128 for conversion and then transmission over network 108 (step 220). The operation of error handling program 130 will now be described in further detail below.

As mentioned, error handling program 130 as discussed in reference to step 230 in FIG. 7, first determines the pixels in the current frame, and any preceding frame(s) frame, whose data is contained in the lost RTP packet(s) (hereinafter, also referred to as the "affected area").

Figure 8:
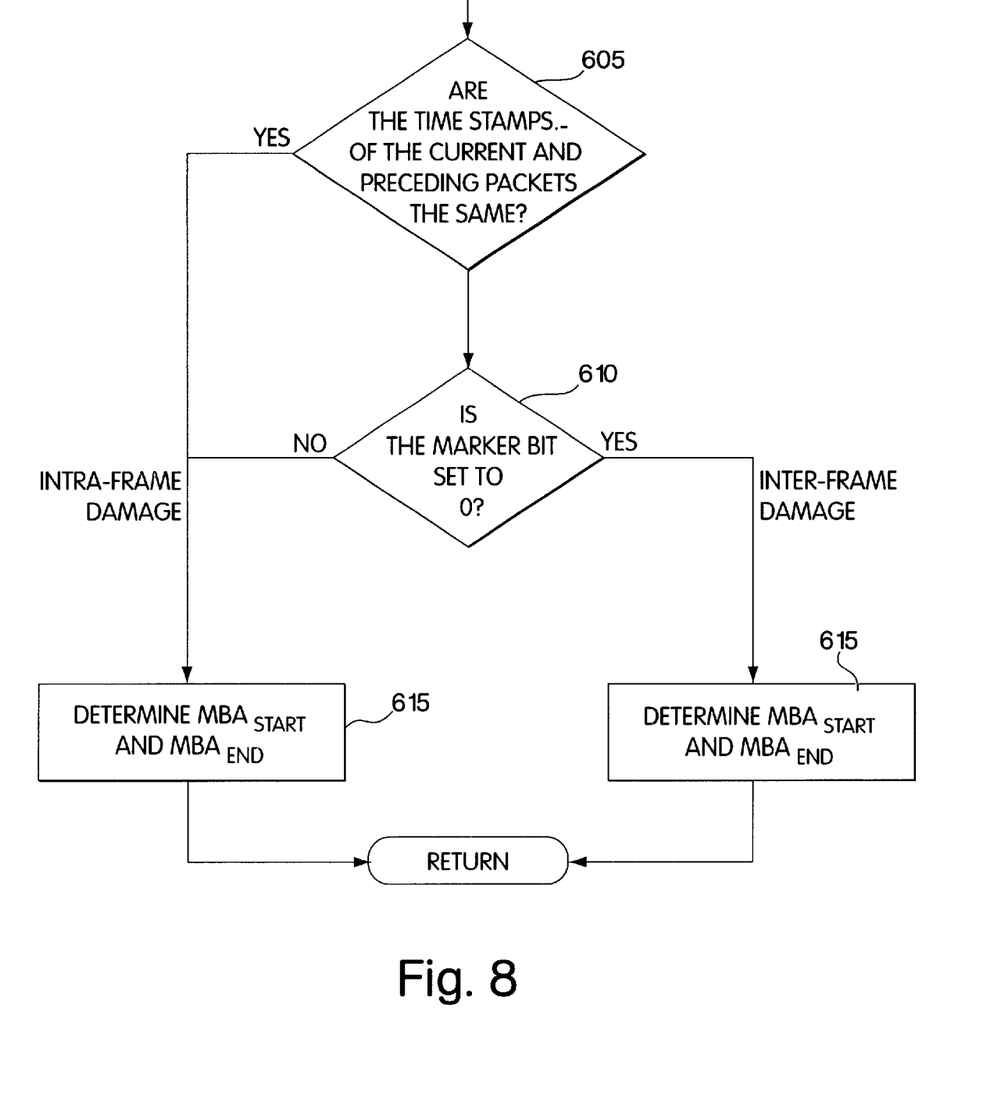
FIG. 8 is a flow chart of the steps taken by an error handling program of the server in FIG. 2 to identify the area affected by a detected packet loss.
Figure 9:
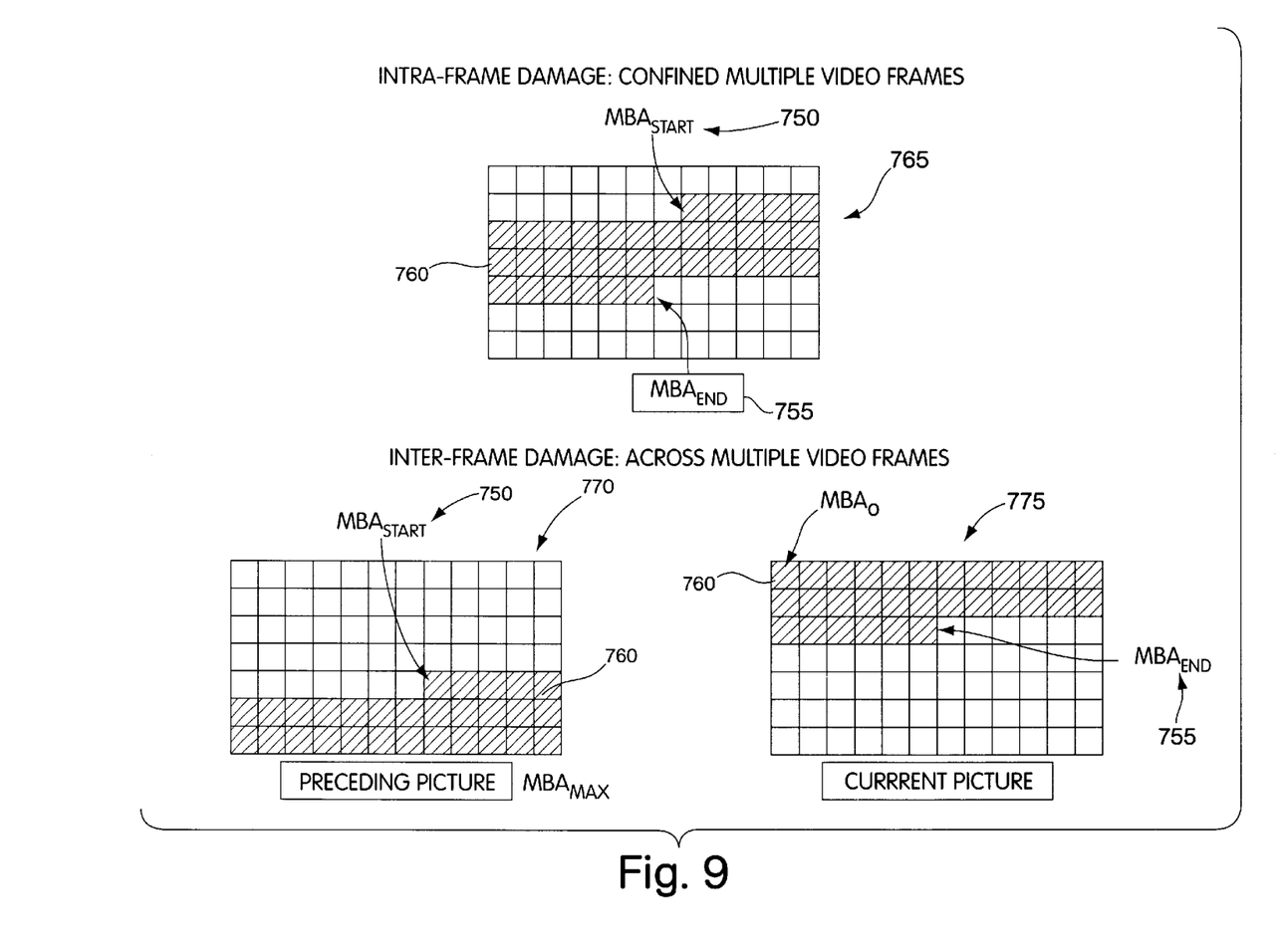
FIG. 9 illustrates areas or pixels in video frames affected by lost packets.

FIG. 8 is a flow chart of the steps taken by error handling program 130 to determine the affected area. These steps can be divided into two functional categories. First, in steps 605–610, error handling program 130 determines whether the affected area is confined to one frame (hereinafter, "intra-frame damage") or extends across two or more frames (hereinafter, "inter-frame damage"). Referring also to FIG. 9, if the damage is an intra-frame damage, then a starting point 750 and an ending point 755 of an affected area 760 will be in the same frame 765. If the damage is an inter-frame damage, then starting point 750 and ending point 755 of affected area 760 will be in different frames 770 and 775. Note that, whether the damage is intra-frame or inter-frame, the starting point will be immediately after the end of the preceding packet. Similarly, whether the damage is intra-frame or inter-frame, the ending point will be immediately before the start of current packet.

Second, in step 615, error handling program 130 determines the starting and ending points of the affected area, so that the area can be identified to transmitting terminal 102 in an error correction request (FIG. 6, step 235). The steps taken by error handling program 130 to perform these two functions will now be described in detail.

First, as mentioned, error handling program 130 determines whether the damage is an intra-frame damage or inter-frame damage. In doing so, error handling program 130 uses the marker bits and time stamps of the preceding and current RTP packets. Error handling program 130 first, in step 605, determines whether the time stamps of the preceding and current RTP packets are the same (i.e. both RTP packets belong to the same frame). If so, error handling program 130 determines that the damage is an intra-frame damage. Otherwise, error handling program 130 checks the marker bit of the preceding RTP packet (step 610). If the marker bit is set to 1, then the preceding RTP packet contains the end of a frame. Since an RTP packet contains data from only one frame and error handling program 130 program assumes that only one frame at a time can be lost, error handling program 130 determines that the damage is an intra-frame damage. If the marker bit of the preceding RTP packet is set to 0 (i.e., the RTP packet does not contain the end of a frame), then error handling program 130 determines that the damage is an inter-frame damage. Note that it should never be the case that the marker bit of the preceding RTP packet is set to 1 and that the time stamps of the preceding and the current RTP packet are the same, since that would indicate that time stamps of two different frames are the same. That would be an error.

Error handling program 130 next determines the starting point and the ending point of the affected area in each video frame affected by the packet loss (step 615).

Error handling program 130 identifies the starting point and the ending point of the affected area by identifying the lost and damaged macroblocks. Error handling program 130 identifies the lost and damaged macroblocks by their Macroblock Addresses (MBA). An MBA is a number assigned to each macroblock in a frame according to the position of that macroblock in that frame. The MBA numbers proceed from $MBA_0$ to $MBA_{max}$ in each frame, with macroblock $MBA_0$ being located in the upper, left corner of the frame and macroblock $MBA_{max}$ being located in the lower, right corner of the frame. MBA value numbers consecutively increase in the standard video scan order—left to right, top to bottom. In the H.263 standard, the macroblock address of a macroblock is determined by multiplying the GOB number of an immediately preceding GOB header by the standard number of macroblocks in each GOB, then counting the number of macroblocks between the GOB header and the macroblock of interest, and finally adding the two numbers together to obtain the desired MBA.

To identify the addresses of the lost or damaged macroblocks, error handling program 130 determines the starting point's MBA ($MBA_{start}$) and the ending point's MBA ($MBA_{end}$) for the damaged area. The process for determining the $MBA_{start}$ and $MBA_{end}$ in the case of intra-frame damages and inter-frame damages are the same except for one thing: for an inter-frame damage, $MBA_{start}$ and $MBA_{end}$ are in two different frames.

In the case of $MBA_{start}$, error handling program 130 determines whether the marker bit for the preceding RTP packet is set to 1 or 0. If set to 1, then the preceding RTP packet represents the end of the previous frame. Since each RTP packet contains data only from one video frame, error handling program 130 determines $MBA_{start}$ to be $MBA_0$ of the subsequent frame. In the described embodiment, it is assumed that only one frame can be lost and therefore, it is assumed that $MBA_{start}$ is $MBA_0$ of the current frame.

If, however, the market bit is set to 0, error handling program 130 finds the address of the last complete macroblock contained in the preceding RTP packet. To do so, error handling program 130 processes the RTP packet beginning from the end of the preceding RTP packet and proceeding to the start of the preceding RTP packet. Error handling program 130 finds the position of the last received GOB start code. Error handling program 130 then uses the GOB number to determine the MBA for the first macroblock after the GOB header from the GOB number contained in the GOB header. Error handling program 130 then decodes the GOB according to the H.263 encoding syntax to parse the bits between the GOB header and the end of the preceding RTP packet so as to determine the MBA of the last macroblock in the RTP packet. $MBA_{start}$ is set to be this determined MBA plus one.

Having determined $MBA_{start}$, error handling program 130 then determines $MBA_{end}$ by processing the current RTP packet. If the current RTP packet is aligned with a GOB header, then $MBA_{end}$ is easily derived from the GOB number in the GOB header. If the current RTP packet is not aligned with a GOB header and the RTP packet is a type 'B' RTP packet, then the $MBA_{end}$ is obtained from the H.263 payload header which stores the MBA of the first macroblock of the current RTP packet. If the current RTP packet is aligned with a GOB header and the RTP packet is a type 'A' RTP packet, then the $MBA_{end}$ is set to be the MBA of the first macroblock following the first GOB start code in the current RTP packet.

As mentioned above, referring back to FIG. 7, having determined the area affected by the packet loss, error handling program 130 then performs two steps (steps 235 and 240): send an error correction request to transmitting terminal 102 and repair the outgoing bit stream so that it appears to receiving terminal 104 (or other downstream components) as not being affected by packet loss. Each of these steps will now be described in detail.

The error correction request sent by error handling program 130 indicates to transmitting terminal 102 that a packet loss has occurred and also identifies lost pixels identifying the lost macroblocks. For an intra-frame damage, the request includes a frame index value which identifies the current frame to transmitting terminal 102, $MBA_{start}$, and $MBA_{end}$. In the H.263 standard, frame index values are referred to as Temporal References (TR) and are the time stamps of the frames. For an inter-frame damage, two requests are sent: one for the preceding frame, identifying the damaged macroblocks therein (a frame index value for the preceding frame, $MBA_{start}$, $MBA_{max}$); and one for the current frame (a frame index value for the current frame, $MBA_0$, $MBA_{end}$).

Being supplied with this information, rather than encoding an entire frame in intra mode (that is, generate an I-frame), transmitting terminal 102 identifies the affected macroblocks and performs error correction techniques which do not require encoding an entire intra mode frame. Such error correction techniques require less data to be sent to receiving terminal 104 to enable receiving terminal 104 to correct for packet loss. Because less data need be transmitted to correct for packet loss errors, problems such as worse frame quality, reduced frame rate, and momentarily frozen images are at least reduced, and possibly avoided altogether.

In the described embodiment, to correct for the error, transmitting terminal 102 re-encodes the video data to be sent without using data representing the area (that is, pixels) identified in the error correction request message. Hence, the video data is encoded without being predicted based on the lost (or damaged) macroblocks. When this re-encoded video data is received by transmitting terminal 104 and decoded, the decoded video data will not have any errors associated with the data in the lost macroblocks, since the data is not encoded using the data in those macroblocks.

To encode the video data in this manner and then send the data, upon receiving the error correction request message from server 110, transmitting terminal 102 stops encoding and packetizing the video data. Transmitting terminal 102 then uses the information in the error correction request to identify the lost macroblocks. Encoder/decoder 102A then re-encodes the already sent video, starting at some point at or before the first lost macroblock, without using the lost data. Transmitting terminal 102 then recommences packetizing the re-encoded data for transmission, starting at the macroblock immediately after the last macroblock sent to receiving terminal 104. For a more detailed description of this error correction technique, see W. Wada, "Selective recovery of video packet loss using error concealment," *IEEE J. Select. Areas Commun.*, vol. 7, pp. 807–814, June 1989). An alternative error correction technique that can be used is the H.263 error tracking technique (see ITU-T Recommendation H.263, *Video Coding for Low Bitrate Communication*, 1998).

As mentioned, error handling program 130 also repairs the outgoing bit stream so that the output bitstream is restored to a legal bitstream according to the H.263 encoding syntax. Thus, to receiving terminal 104, the bitstream appears not to be affected by any transmission errors. To repair the bitstream, error handling program 130 performs two functions. First, error handling program 130 generates an ITU-T H.221 bit stream containing "empty" macroblocks corresponding to the lost macroblocks which were previously identified. For example, the error handling program 130 generates appropriate GOB headers together with data representing empty macroblocks. In the case of H.263, such macroblocks would have a coded/unencoded (COD) bit, which would be set to indicate that the blocks are unencoded. Second, error handling program 130 uses the information in the RTP header from the current packet to convert prediction coded control data, such as the first macroblock's motion vector, into their actual values. Hence, the first macroblock can be properly decoded by encoder/decoder 104A of receiving terminal 104, even though receiving terminal 104 does not detect a packet loss error and therefore fails to retrieve, from the RTP packet header, the relevant control data.

Other embodiments are within the scope of the following claims.

For example, more than one server may be located between the transmitting terminal 102 and receiving terminal 104. In such a case, each of the servers can perform error correction and concealment in the manner described here. Note that, when a server conceals an error, another server downstream preferably does not detect the same error. The downstream server will detect errors which occur during transmission between the two servers. Additionally, one or more of these servers may form part of a network, such as network 106 or 108. In that case, the entire data path between transmitting terminal 102 and receiving terminal 104 can be within the same network.

The techniques described here can be used for transmission and receipt of two-way, interactive videoconferencing and video telephony. The techniques can also be used for internet video streaming.

The embodiments and techniques described here are mainly described in reference to videoconferencing or video telephony, that is transfer of audio and video data. For example, terminals 102 and 104 are described as being videoconferencing or video telephone systems. However, these techniques can also be used for transfer of other types of data and for other applications.

It is to be understood that while the invention has been described in conjunction with the detailed description thereof, the foregoing description is intended to illustrate and not limit the scope of the invention, which is defined by the scope of the appended claims. Other aspects, advantages, and embodiments are within the scope of the following claims.

What is claimed is:

1. A method of transmitting data from a transmitting terminal to a receiving terminal through a server comprising
   transmitting data from the transmitting terminal to the server via a first network operating according to a first data transmission protocol;
   detecting transmission errors in the transmitted data at the server;
   sending a request from the server to the transmitting terminal, if a transmission error is detected at the server, for data correcting the effects of the detected transmission error on the transmitted data affected by the detected transmission error; and
   transmitting via a second network operating according to a second data transmission protocol different from the first data transmission protocol at least a portion of the affected data from the server to the receiving terminal prior to receiving the correction data.

2. The method of claim 1 wherein the server is connected between the first network and the second network and transmits data from one of the networks to the other.

3. The method of claim 1 wherein the data comprises a plurality of packets.

4. The method of claim 3 wherein the data is digital video data.

5. The method of claim 4 wherein the digital video data is compressed digital video data.

6. The method of claim 5 wherein the compressed digital video data is compressed by a compression technique including motion compensation.

7. The method of claim 3 wherein the detected transmission error comprises a loss of at least one packet.

8. The method of claim 7 wherein the packets are consecutive packets of data identified by sequence numbers, and detecting the loss of said at least one packet includes detecting a missing sequence number.

9. The method of claim 3 wherein the data is digital video data, the method further comprising
   determining at the server pixels of at least one frame affected by a lost packet, and wherein the request identifies at least a portion of those pixels.

10. The method of claim 9 wherein each of the affected pixels is from a single frame.

11. The method of claim 9 wherein the pixels are from at least two consecutive frames.

12. The method of claim 1 further comprising processing the transmitted data at the server to conceal the detected error.

13. The method of claim 12 further comprising transmitting the data from the server to the receiving terminal according to a predetermined syntax and wherein processing the transmitted data comprises modifying the packets such that the transmitted data conforms to the predetermined syntax.

14. The method of claims 1 further comprising:
   sending, in response to the request, data to the receiving terminal to correct the effects of the detected transmission error on the data affected by the detected transmission error.

15. The method of claim 14 wherein the data is compressed digital video data compressed by a prediction based compression technique, and the detected transmission error comprises loss of data during transmission, the method further comprising
   compressing the digital video data, using said compression technique, without relying on video data corresponding to data lost during transmission, to provide the data sent to correct the effects of the detected transmission error on the data affected by the detected transmission error.

16. A server for receiving data transmitted by a transmitting terminal via a first network operating according to a first data transmission protocol and transmitting the data to a receiving terminal via a second network operating according to a second data transmission protocol different from the first data transmission protocol comprising:
   a receiver receiving data transmitted from the transmitting terminal to the server;
   a detector detecting transmission errors in the received data;
   a first transmitter sending, if a transmission error is detected, a request to the transmitting terminal for data correcting the effects of the detected transmission error on the received data affected by the detected transmission error; and
   a second transmitter transmitting at least a portion of the affected data from the server to the receiving terminal prior to receiving the correction data.

17. The server of claim 16 wherein the server is connected between the first network and the second network and transmits data from one of the networks to the other.

18. The server of claim 16 wherein the data comprises a plurality of packets.

19. The server of claim 18 wherein the data is digital video data.

20. The server of claim 19 wherein the digital video data is compressed digital video data.

21. The server of claim 20 wherein the compressed digital video data is compressed by a compression technique including motion compensation.

22. The server of claim 18 wherein the detector detects the transmission error by the loss of at least one packet.

23. The server of claim 22 wherein the packets are consecutive packets of data identified by sequence numbers and the detector detects loss of said at least one packet by detecting a missing sequence number.

24. The server of claim 18 wherein the data is digital video data and the server determines pixels in at least one frame affected by a lost packet, wherein the request identifies those pixels.

25. The system of claim 24 wherein each of the affected pixels is from a single frame.

26. The system of claim 24 wherein the pixels are from at least two consecutive frames.

27. The server of claim 16 further comprising a processor processing the received data, prior to transmitting to the receiving terminal, to conceal the detected error.

28. The server of claim 27 wherein the data is transmitted by the server to the receiving terminal according to a predetermined syntax and wherein the processor processes the transmitted data to modify the packets such that the transmitted data conforms to the predetermined syntax.

29. The server of claims 16 wherein the transmitting terminal, in response to the request, sends data to the receiving terminal to correct the effects of the detected transmission error on the data affected by the detected transmission error.

30. The server of claim 29 wherein the data is compressed digital video data compressed by a prediction based compression technique, and the detected transmission error comprises loss of data during transmission, and wherein the data sent by the transmitting terminal to correct the effects of the detected transmission error on the data affected by the detected transmission error comprises digital video data compressed by said compression technique, without relying on video data corresponding to the data lost during transmission.

31. A system comprising
    a transmitting terminal,
    a receiving terminal, and
    a server,
    the transmitting terminal transmitting data via a first network operating according to a first data transmission protocol to the server for processing, and
    the server detecting transmission errors in the transmitted data; sending a request to the transmitting terminal, in response to one of the detected transmission errors, for data correcting the effects of the detected transmission error on the transmitted data affected by the detected transmission error; and transmitting via a second network operating according to a second data transmission protocol different from the first data transmission protocol at least a portion of the affected data from the server to the receiving terminal prior to receiving the correction data.

32. The system of claim 31 wherein the server is connected between the first network and the second network and transmits data from one of the networks to the other.

33. The system of claim 31 wherein the data comprises a plurality of packets.

34. The system of claim 33 wherein the data is digital video data.

35. The system of claim 34 wherein the digital video data is compressed digital video data.

36. The system of claim 35 wherein the compressed digital video data is compressed by a compression technique including motion compensation.

37. The system of claim 33 wherein the server detects a loss of at least one packet as a transmission error.

38. The system of claim 37 wherein the packets are consecutive packets of data identified by sequence numbers and the server detects the loss of said at least one packet by a missing sequence number.

39. The system of claim 33 wherein the data is digital video data and the server determines pixels of a frame affected by a lost packet, wherein the request identifies the pixels.

40. The system of claim 39 wherein each of the affected pixels is from a single frame.

41. The system of claim 39 wherein the pixels are from at least two consecutive frames.

42. The system of claims 33 wherein the transmitting terminal, in response to the request, sends data to the receiving terminal to correct the effects of the detected transmission error on the data affected by the detected transmission error.

43. The system of claim 42 wherein the data is compressed digital video data compressed by a prediction based compression technique, and the detected transmission error comprises loss of data during transmission, and wherein the data sent by the transmitting terminal to correct the effects of the detected transmission error on the data affected by the transmission error comprises digital video data compressed by said compression technique, without relying on video data corresponding to the data lost during transmission.

44. The system of claim 31 further wherein the server comprises a processor processing the received data, prior to transmitting to the receiving terminal, to conceal the detected error.

45. The system of claim 44 wherein the server transmits the data to the receiving terminal according to a predetermined syntax and wherein the processor processes the transmitted data by modifying the packets such that the transmitted data conforms to the predetermined syntax.

* * * * *